No. 635,960. Patented Oct. 31, 1899.
H. G. GRUSH.
CONDUCTOR AND CABLE TERMINAL.
(Application filed Aug. 24, 1899.)
(No Model.)
Fig. 1.
Fig. 2.
Fig. 3.
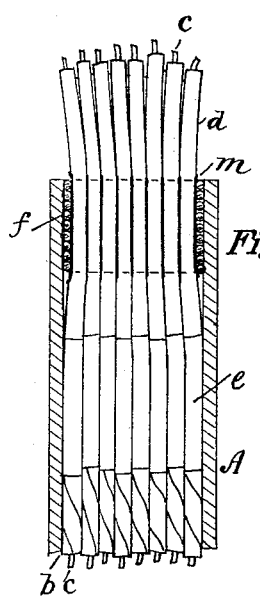
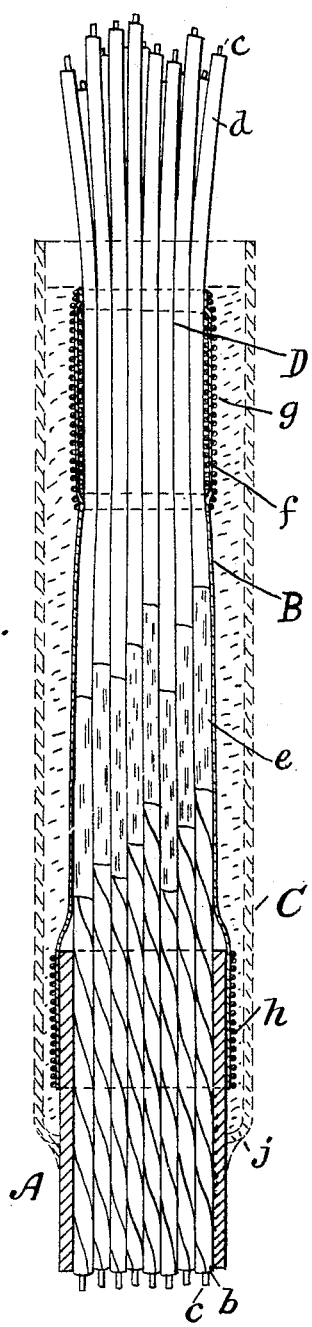
Attest.
R. P. Jackson
H. L. Harding
Inventor
Henry G. Grush.

UNITED STATES PATENT OFFICE.

HENRY G. GRUSH, OF BOSTON, MASSACHUSETTS.

CONDUCTOR AND CABLE TERMINAL.

SPECIFICATION forming part of Letters Patent No. 635,960, dated October 31, 1899.

Application filed August 24, 1899. Serial No. 728,287. (No model.)

*To all whom it may concern:*

Be it known that I, HENRY G. GRUSH, residing at Boston, in the county of Suffolk and State of Massachusetts, have invented certain Improvements in Conductor and Cable Terminals, of which the following is a specification.

In the present art of conductor and cable construction there is a large class in which dry air is employed as an insulator, the individual conductors being surrounded by a fibrous insulation, such as paper, loosely applied and secured, and the conductors are placed in an impermeable sheath, as lead, in such a manner that each conductor is prevented from coming into contact with any other by its own fibrous insulation, while all of the conductors have the advantage of the insulation of the dry air sealed in the sheath. In such conductors and cables when they are to be placed in situation and the conductors are to be connected to the conductors of another cable or are to be connected to any external conductors or terminals it is of the utmost importance that the dry-air insulation shall not be permitted to escape or that moist external air be substituted therefor, and the present invention addresses itself to means for the preservation of the dry-air insulation and also to the prevention of moisture reaching the fibrous insulation.

The invention therefore relates to an improved terminal for conductors and cables, which may be constructed as a separate piece and then connected to the end of a conductor or cable, or it may be made upon the cable end. In either case the outer ends of the conductors are covered with a waterproof insulation and means are provided for closing the end of the sheath onto the peripheries of the insulated conductors, so that the end of the cable is sealed and rendered impervious to the entrance of air or moisture.

I have found that when cables containing conductors with paper insulation are subjected to extremes of temperature sometimes the air-pressure within the sheath is less than the surrounding air and at other times the pressure is more, and the invention aims to provide a seal at the end of the cable which will prevent the exit of dry air from the cable, as well as the entrance of moist air thereto from without the cable, and thus preserve an equilibrium within the sheath.

In the drawings which illustrate the invention, Figure 1 is a longitudinal section thereof. Fig. 2 is a detail, and Fig. 3 is a modified construction.

Referring to Fig. 1, A is a lead sheath, and *c c c* a plurality of conductors therein, which are shown as extending for a suitable distance beyond the end of the sheath. That portion of the conductors *c* within the sheath and for a slight distance beyond its end are covered by a fibrous insulation *b*, such as paper loosely wrapped therearound and secured in a proper manner, and that portion of the conductors which extends from the sheath outward is covered with an elastic or flexible waterproof insulation *d*, and at the junction of the two kinds of insulation a suitable insulating-wrapping *e* incloses and protects the same. At a suitable distance between the end of the sheath and the ends of the conductors stout cord or tape *f* is wound tightly around the outer peripheries of the insulation *d* of the combined conductors to form a band, so as to press the contiguous or inner surfaces of the insulation closely together and close all the interstices and to make practically a solid body D of the same.

B is a tube of some impermeable and preferably of elastic substance, as flexible rubber, although it could be of some rigid material, as lead. The tube is passed over the conductors so that one end is brought over the end of the sheath A and is secured thereto by a tight winding *h*, of cord or wire. The tube is of such a length that its other end incloses and covers the winding *f*, upon which it is secured by the winding *g*. When the tube B is of metal, it may be soldered to the sheath and the winding *h* be dispensed with. It will be seen that when the tube B is thus secured it constitutes an extension of the sheath A, and the end of the cable is hermetically sealed, and it has been found by experiment that by forcing air into the cable the tube may be ruptured, but no air can be forced through either end of the same, and the converse is also true that external air cannot find its way into the cable at the terminal.

With some kinds of water insulation for the conductors it may be necessary to slip short lengths of quite flexible tubing $m$ over the same at the section to be compressed in order that when they are compressed a perfectly air-tight plug D may be obtained, as shown in Fig. 2.

In case the tube B is made of any material which is liable to become oxidized by contact with the external air, as flexible rubber, I may inclose it in a larger tube or shell C, which is shown in dotted lines, and is soldered at one end to the outer surface of the sheath A, while its outer end extends beyond the compressed or solid body or plug D, and the space or annulus between the tube B and the tube C is filled to cover the surfaces of the former tube with any suitable preservative $i$ which will remain in a solid state, as tar.

The outer ends of the solidly-insulated conductors $c$ $d$ may be of any length desired, and as they are flexibly independent of each other form terminals for any required extension of the conductors $c$ $b$.

In Fig. 3 each conductor has a tube $m$, of soft rubber, over it, and all the conductors are compressed by the winding or band $f$. The sheath A is then formed or drawn over and compressed upon the winding or band to form the seal.

I claim as my invention—

1. A terminal for an electric cable consisting of an impermeable sheath inclosing a plurality of conductors insulated with fibrous material for the principal part of the cable's length and with flexible waterproof insulation at their terminals which extend beyond the end of the sheath; a section of the waterproofed insulation being tightly compressed by a winding or band and the sheath hermetically sealed thereto, as set forth.

2. An electric cable consisting of a plurality of conductors insulated with fibrous material in an impermeable sheath, the conductors extending beyond the end of the sheath and insulated for such extension with flexible waterproof insulation, a section of which are tightly compressed together by an external winding or band, the sheath being hermetically sealed with the compressed section, as set forth.

3. An electric cable consisting of a plurality of conductors insulated with fibrous material, in an impermeable sheath, the conductors at the cable ends being covered with a flexible waterproof insulation, a section of which are tightly compressed together by an external winding or band, with means for hermetically sealing the cable end which consists of an extension of the said sheath inclosing and tightly embracing the said compressed section.

4. In a terminal for a cable, an impermeable sheath inclosing a plurality of conductors which project beyond the end of the same, the conductors being protected with fibrous insulation within the sheath and with water insulation outside the sheath; with means for sealing the sheath with a compressed section of the outer or water insulation of the conductors, which consists of an impermeable elastic tube, as set forth.

5. In a terminal for a cable, an impermeable sheath inclosing a plurality of conductors which extend beyond the end of the same, the conductors within the sheath being protected with fibrous insulation, and with water insulation at their outer ends; each conductor of a section having the latter insulation being surrounded by a tube of flexible insulation, and all the tubes and conductors of said section being tightly compressed by a winding or band; with means for sealing the sheath with the said compressed section, consisting of an impermeable elastic tube, as set forth.

6. An electric cable the conductors of which are insulated for the principal part of their length with fibrous material, inclosed in an impermeable sheath, the conductors at the cable ends being covered with a flexible waterproof insulation, and a suitable wrapping on each conductor at the juncture of the two kinds of insulation; a section of the said waterproof insulated conductors being tightly compressed together by an external winding or band; with means for hermetically sealing the cable end which consists of an extension of the said sheath inclosing and tightly embracing the said compressed section.

7. An electric cable consisting of a plurality of conductors insulated with fibrous material, in an impermeable sheath, the conductors at the cable end being covered with a flexible waterproof insulation, a section of which are tightly compressed together by an external winding or band, with means for hermetically sealing the cable end which consists of an extension of the said sheath inclosing and tightly embracing the said compressed section, the said extension being surrounded by a shell one end of which is soldered to the said sheath, and the space between the extension and the shell being filled with a preservative compound.

In testimony whereof I have signed my name to this specification, in the presence of two subscribing witnesses, this 12th day of August, 1899.

HENRY G. GRUSH.

Witnesses:
R. P. JACKSON,
H. L. HARDING.